United States Patent [19]

Abe

[11] Patent Number: 4,784,710
[45] Date of Patent: Nov. 15, 1988

[54] METHOD FOR MANUFACTURING A VEHICLE SEAT

[75] Inventor: Tadafumi Abe, Akishima, Japan

[73] Assignee: Tachi-S Co., Ltd., Akishima, Japan

[21] Appl. No.: 102,165

[22] Filed: Sep. 29, 1987

[51] Int. Cl.$^4$ .............................................. B29C 65/08
[52] U.S. Cl. ..................................... 156/73.1; 156/78; 156/580.1; 264/23
[58] Field of Search ...................... 156/73.1, 78, 580.1, 156/580.2; 264/23; 228/1.1

[56] References Cited

U.S. PATENT DOCUMENTS 3,635,609  1/1972  Balamuth ............................... 264/23
4,393,116  7/1983  Taylor .................................. 156/73.1
4,561,917  12/1985 Urai ........................................ 264/23

FOREIGN PATENT DOCUMENTS 59-230590  12/1984  Japan.

Primary Examiner—Michael Wityshyn
Attorney, Agent, or Firm—Oldham & Oldham Co.

[57] ABSTRACT

A method of manufacturing a vehicle seat, in which a foam cushion member is placed on an auxiliary support member so that the welding region of the cushion member is positioned horizontally, presenting a flat line, then a covering member is placed on said cushion member, and said covering member and cushion member are welded together by means of ultrasonic welding. In this way, said covering member is uniformly welded to said cushion member.

5 Claims, 2 Drawing Sheets

METHOD FOR MANUFACTURING A VEHICLE SEAT

BACKGROUND OF THE INVENTION

1. Field of the Invention

The present invention relates to a method of manufacturing a vehicle seat such as an automotive seat, and in particular to an ultrasonic welding method for the vehicle seat, in which a covering member is welded to a foam cushion member by means of ultrasound.

2. Description of the Prior Art

There has been a difficulty in welding a covering member to a foam cushion member of a certain shape foamed in a mold, by use of a high frequency wave welding method. In a recent prior art, there has been proposed an ultrasonic welding method to tide over such difficulty, which is disclosed in the Japanese Laid-Open Patent Publication No. 59-230590. This first invention enables welding to a cushion member such a covering member of material and shape that have been difficult to do so by the high frequency wave method, and as a further advantage, it allows extending its welding to other covering members, including the one that is apt to be damaged by a spark occuring in the high frequency wave welding process.

However, in such ultrasonic welding method, a problem has existed in that, when an ultrasonic vibration horn having a great welding area is used, the covering member can not be welded uniformly to the cushion member at their mutual welding regions.

Our research for the cause of this problem reveals that it is attributed to an uneven state between the welding portion of the ultrasonic vibration horn and the thickness of the cushion member. In other words, in the case where the welding portion of the ultrasonic vibration horn is formed greater in length (for example, 25 cm) and unevenly formed is the thickness of the cushion member beneath such welding portion of the horn, then there is a varied pressure distribution of the horn against the cushion member due to the uneven thickness of the cushion member, with the result that the ultrasonic welding through the horn is not effected uniformly to the cushion member.

SUMMARY OF THE INVENTION

It is a purpose of the present invention to provide a method of manufacturing a vehicle seat in which a covering member is welded positively and uniformly to a foam cushion member having a varied thickness, using an ultrasonic vibration horn which has a great welding area.

In order to solve the above-mentioned problems of conventional method, the present invention is developed, bearing in mind that all of the commonly available cushion members are formed flat in their bottom walls as they are to be mounted on a horizontal frame disposed in parallel with a floor of the vehicle, and that, in such common cushion members, the central seating portion thereof, i.e. a welding region where the corresponding portion of cushion member is to be welded to the corresponding portion of covering member, is sloped in the longitudinal direction thereof, not in parallel with the bottom walls of the cushion member.

Therefore, we notice the fact that such sloped central seating portion of the cushion member can be positioned horizontally, representing a flat line, by raising one end portion of the cushion member where its central seating portion is minimum in thickness.

The present invention takes the advantage of this fact, and employs an auxiliary support member which is placed under the cushion member so as to bring the central seating portion (i.e. a welding region) of the cushion member to a substantially horizontal line, whereby a cover member can be welded uniformly to the central seating portion of cushion member by way of ultrasonic welding method.

Accordingly, due to such auxiliary support member being placed under the cushion member, the thickness of the cushion member is rendered uniform as opposed to non-uniform thickness of the cushion member per se, and thus, the ultrasonic vibration horn of ultrasonic welding apparatus can be pressed against the welding region of the cushion member in a uniform manner, under one fixed degree of pressure.

For this reason, the entire welding region of the covering member can be uniformly welded to that of the cushion member, using the ultrasonic welding apparatus.

In one aspect of the present invention, the ultrasonic welding is improved far more by providing an auxiliary support member made of a foam material generally identical to the cushion member and having an elasticity generally equal to that of the cushion member, with the formation of the auxiliary support member being such that, when it is superposed on the cushion member, the total thickness of both those two members becomes uniform. Accordingly, more positively, the ultrasonic vibration horn of ultrasonic welding apparatus can be pressed uniformly against a covering member and the cushion member, thereby ensuring to weld together the entire welding regions of both covering and cushion members.

DETAILED DESCRIPTION OF PREFERRED EMBODIMENTS OF THE INVENTION

Figure 1:
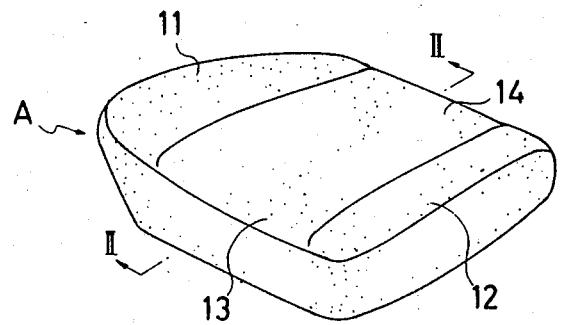
FIG. 1 is a perspective view of a foam cushion member to be utilized in the present invention.
Figure 2:
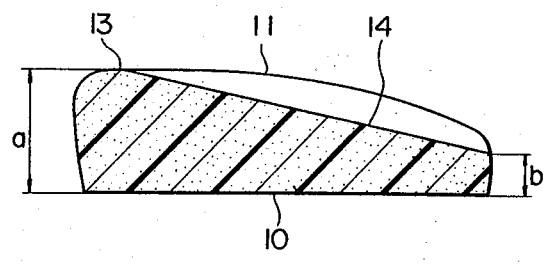
FIG. 2 is a sectional view taken along the line II—II in the FIG. 1.

Referring to FIGS. 1 and 2, designation (A) denotes a foam cushion member to be used in the present invention. The foam cushion member (A) is made of urethane foam and foamed in a mold into a predetermined shape, and is the one commonly used as an automotive seat cushion. The bottom surface (10) of the cushion member (A) is formed flat so as to be mounted on a seat frame (not shown), and on the upper surface of the cushion member (A), are formed right- and leftside raised portions (11)(12) and a forward raised portion (13). Among those raised portions (11,12,13), there is formed a sloped central seating portion (14) which is sloped downwardly from the forward raised portion (13) to the opposite end of the cushion member (A). Hence, as a preferred embodiment, the arrangement of the cushion member (A) is such that the thickness at the point (a) of the forward raised portion (13) is 100 mm while the thickness at the point (b) of the central seating portion (14) is 20 mm, with the hardness of the cushion member (A) per se being in the range of 10 kg to 15 kg according to the procedure hereinafter described.

Figure 3:
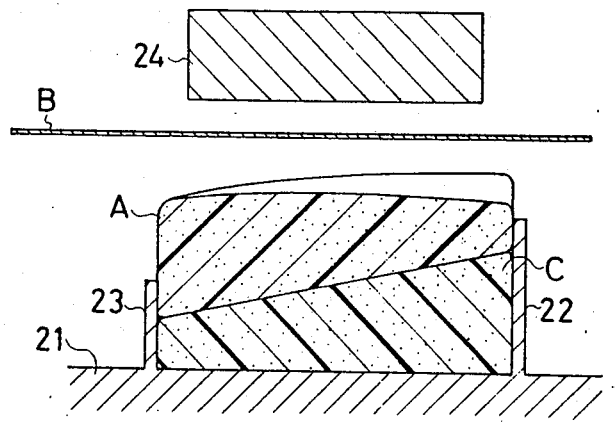
FIG. 3 is a sectional view which shows the steps of the present invention method, prior to a welding process.

Referring to FIG. 3, there is shown a covering member (B) to be welded to the above-mentioned foam cushion member (A). The covering member (B) is made of an ultrasonic weldable material (for example, a material belonging to a polyester group).

Hereinafter, a description will be given as to the steps of effecting an ultrasonic welding method for welding the covering member (B) to the foam cushion member (A), with reference to FIGS. 3 through 5.

At first, in the present embodiment, the ultrasonic welding is effected in such a way that the covering member (B) is welded to the boundary between the central seating portion (14) and the right- and left-raised portions (11)(12), as well as the interior of the central seating portion (14), or the portions of the cushion member (A) to which conventionally the covering member (B) is fixed by means of anchoring members or the like.

Although not shown, an ultrasonic welding apparatus to be used in the present invention comprises ultrasound generation mechanisms and an ultrasonic vibration horn, including other required elements and mechanisms in a conventional manner. The ultrasonic vibration horn, preferably, has a great welding area.

Now, an auxiliary support member (C) is mounted within guides (22)(23) uprightly formed on a lower base member (21) of an ultrasonic welding apparatus (not shown).

Then, the cushion member (A) is placed on the upper surface of the auxiliary support member (C) so that the sloped central seating portion (14) is positioned horizontally, presenting a flat line, relative to the ultrasonic welding apparatus.

In this connection, it is preferable that the auxiliary support member (C) is made of urethane foam having a hardness substantially equal to that of the cushion member (A), and further is of such a configuration that the sloped central seating portion (14) of the cushion member (A) superposed on the auxiliary support member (C) is disposed horizontally, presenting a flat plane. In the illustrated embodiment, the configuration of the auxiliary support member (C) is formed in a reverse manner in relation to that of the sloped central seating portion (14) of the cushion member (A), whereupon the lamination of those two members (A,B) takes on a substantially rectangular shape in section, providing a uniform thickness at the area corresponding to the central seating portion (14), as seen in FIG. 3. But, the configuration and material of the auxiliary support member (C) are not limited to the illustrated embodiment, and may be altered to equivalent structures so long as they function in the same manner as described above.

Figure 4:
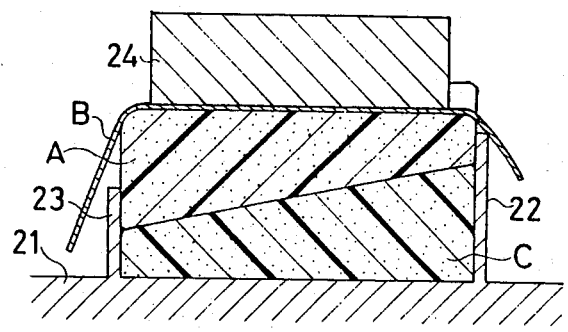
FIG. 4 is a sectional view showing the state in which a welding is being effected.
Figure 5:
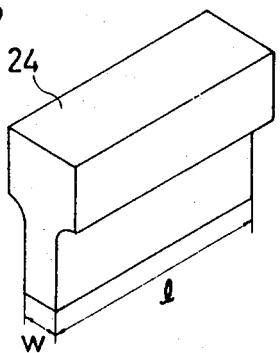
FIG. 5 is a perspective view of an ultrasonic vibration horn used in the present invention.

Next, the covering member (B) is placed on the cushion member (A), and thereafter, as shown in FIG. 4, the ultrasonic vibration horn (24) of the ultrasonic welding apparatus is lowered and pressed against both covering and cushion members (B)(A) so as to weld the former to the welding regions of the latter by means of ultrasonic welding operation.

Accordingly, it will be seen that the welding region (namely the central seating portion (14)) of the cushion member (A) is positioned horizontally, and that the total thickness of the auxiliary and cushion members (C)(A) becomes uniform at the welding region of the cushion member (A).

Several experimentations on the above-described method show that, for example, in case of a cushion member whose thickness at its welding region is that the minimum thickness is 20 mm and the maximum one is 100 mm, using an ultrasonic vibration horn (24) of the type shown in FIG. 5 with 250 mm length and 4 mm width, the optimum conditions for operation of the ultrasonic welding apparatus are found as follows:

Frequency: 20 khz
Amplitude: 100
Horn pressure: 170 kg–190 kg
Ultrasound emitting time: 1.5 sec.–2.0 sec.
Cooling time: 2.0 sec.–3.0 sec.
Output loading factor: 40%

(a) From a material to be tested, a sample strip of 48–55 mm thickness and having such area enough to encircle the circle of approx. 30 cm diameter is collected.

(b) Such sample strip is placed on a table of a testing apparatus, and then a circle-shaped pressure plate of the testing apparatus whose diameter is 200.0±0.1 mm is brought to contact with the upper surface of the sample strip and a load of 0.5 kgf(4.9N) is applied through the pressure plate to the sample strip.

Then, the thickness of thus-pressed sample strip is measured as an initial thickness. Next, the circle-shaped pressure plate is pressed into the sample strip at the rate of not more than 10 mm/s to such a degree that the pressure plate is sunk in the sample strip down to the level of 75% of the initial thickness. Immediately thereafter, the load is released, and the pressure plate is at once pressed into the same strip once again at the rate of not more than 10 mm/s, down to the level of 25% of the initial thickness, and stopped as it is. At 20 seconds after such stopped state, the amount of the load applied is read at the unit of as small as 0.1 kgf(0.98N) and determined as a hardness of the material in question. The present test is carried out one time, and the result amount obtained shall be indicated at an integral number.

From the above description, it will be appreciated that the present invention is endowed with the undermentioned advantages.

(1) Merely placing the cushion member (A) on the auxiliary support member (C) permits the former member to be positioned substantially horizontally relative to the ultrasonic welding apparatus. Thus, there is no need to install a special equipment for securing the covering member (B) to the cushion member (A), and by merely lowering the ultrasonic vibration horn (24) against those members, the ultrasonic welding can be rapidly and easily effected.

(2) The thickness of the cushion member (A), where the welding is to be effected, is uniform because of the auxiliary support member (C) lying under the cushion member (A). This allows the ultrasonic vibration horn (24) to be pressed uniformly against the welding region of the cushion member (A), and further eliminates the necessity to vary the ultrasonic welding conditions (for example, hardness of the cushion member, amplitude, etc.), considering the local minute different states of the entire welding region of the cushion member (A). Accordingly, the welding conditions can be set in a uniform manner with regard to the entire welding region of the cushion member (A), and the covering member (B) can be positively and uniformly welded to the cushion member (A).

The description above has just been given of preferred embodiments of the present invention, but the invention is not limited to the embodiments illustrated but various other replacements, modifications and additions may structurally be possible without departing from the scope and spirit of the appended claims for the invention.

What is claimed is:

1. A method of manufacturing a vehicle seat, comprising the steps of:

placing a foam cushion member of varying thickness on an auxiliary support member of varying thickness inverse to the varying thickness of said cushion member;

said foam cushion member being flat in its welding region;

said auxillary support member being adapted to support said foam cushion member so that said welding region of said cushion member is positioned substantially horizontally;

then, placing a thermally weldable covering member on said welding region of said cushion member;

applying a pressure against said covering member and said foam cushion member in a downward direction, and welding said covering member by means of ultrasound to said welding region of said cushion member, using an ultrasonic welding apparatus.

2. The method as defined in claim 1, wherein said auxiliary support member is formed of a material having a hardness substantially equal to that of said cushion member.

3. The method as defined in claim 1, wherein when said cushion member is placed on said auxiliary support member, the height of said cushion member at its welding region thereby being made substantially uniform.

4. The method as defined in claim 1, wherein said ultrasonic welding apparatus include a lower base member and guide means formed on said lower base member, and wherein said auxiliary support member and cushion member are placed within said guide means.

5. The method as defined in claim 1, wherein said cushion member has at its welding region such a thickness that its minimum thickness is 20 mm and its maximum thickness is in the range of more than 20 mm to not more than 100 mm.

* * * * *